(12) United States Patent
Avasarala et al.

(10) Patent No.: US 7,561,689 B2
(45) Date of Patent: Jul. 14, 2009

(54) GENERATING KEYS HAVING ONE OF A NUMBER OF KEY SIZES

(75) Inventors: Prasad Avasarala, Bangalore (IN); Amit Badole, Khargone (IN); Anil Narayan Nair, Maharashtra (IN); Rahul Vijay Wagh, Maharashtra (IN)

(73) Assignee: Agere Systems Inc., Allentown, PA (US)

( * ) Notice: Subject to any disclaimer, the term of this patent is extended or adjusted under 35 U.S.C. 154(b) by 693 days.

(21) Appl. No.: 10/870,394

(22) Filed: Jun. 17, 2004

(65) Prior Publication Data

US 2006/0002549 A1   Jan. 5, 2006

(51) Int. Cl.
*H04L 9/00*   (2006.01)

(52) U.S. Cl. .............................. 380/44; 380/28; 380/45; 380/47

(58) Field of Classification Search .................. 380/44, 380/45, 47, 28
See application file for complete search history.

(56) References Cited

U.S. PATENT DOCUMENTS

| | | | | |
|---|---|---|---|---|
| 6,937,727 | B2* | 8/2005 | Yup et al. | 380/37 |
| 7,212,631 | B2* | 5/2007 | Averbuj et al. | 380/37 |
| 2002/0131588 | A1* | 9/2002 | Yang | 380/37 |
| 2003/0059054 | A1* | 3/2003 | Hu et al. | 380/277 |
| 2003/0198345 | A1* | 10/2003 | Van Buer | 380/43 |
| 2003/0223580 | A1* | 12/2003 | Snell | 380/28 |
| 2005/0213756 | A1* | 9/2005 | Hubert | 380/44 |

OTHER PUBLICATIONS

Biham, E., "A Note on Comparing the AES Candidates," Second AES Cand. Conf. (1999).
Biham et al., "Power Analysis of the Key Scheduling of the AES Candidates," Second AES Cand. Conf. (1999).
Daemen et al., "AES Proposal: Rijndael," The Rijndael Block Cipher, Document Version 2, pp. 1-45 (1999).
Daemen et al., "The Design of Rijndael," Springer-Verlag, pp. 43-79 (2002).
Elbirt et al., "AN FPGA Implementation and Performance Evaluation of the AES Block Cipher Candidate Algorithm Finalists," Third AES Candidate Conference (2000).

(Continued)

*Primary Examiner*—Emmanuel L Moise
*Assistant Examiner*—Paul Callahan
(74) *Attorney, Agent, or Firm*—Ryan, Mason & Lewis, LLP

(57) ABSTRACT

An apparatus is disclosed for generating keys having one of a number of key sizes. Memory sections of a memory element are adapted to store a portion of a key. The memory element has a size at least as large as a largest key size of a number of key sizes, the key having a size of one of the plurality of key sizes. Key generation logic is adapted to generate intermediate key results for the key by operating on values from the memory sections and from the intermediate key results. Key selection logic is adapted to route selected intermediate key results to selected ones of the memory sections. The control logic is adapted to determine the size of the key and, based at least partially on the size of the key, to select the selected intermediate key results and the selected ones of the memory sections. The selected intermediate key results comprise some or all of the key.

20 Claims, 11 Drawing Sheets

OTHER PUBLICATIONS

Gaj et al., "Comparison of the Hardware Performance of the AES Candidate Using Reconfigurable Hardware," Third AES Candidate Conference (2000).

Gladman, B., "Implementation Experience with AES Candidate Algorithms," Second AES Conference (Feb. 28, 1999).

Hachez et al., "cAESar Results: Implementation of Four AES Candidates on Two Smart Cards," Second AES Cand. Conf. (Feb. 4, 1999).

Keating, G., "Performance Analysis of AES Candidates on the 6805 CPU Core," Second AES Cand. Conf. (Feb. 1, 1999).

Landau, S., "Polynomials in the Nations Service: Using Algebra to Design the Advanced Encryption Standard," American Mathematical Monthly, pp. 89-117 (2004).

Weaver et al., "A Comparison of the AES Candidates Amenability to FPGA Implementation," Third AES Candidate Conference (2000).

Welschenbach, M., "Cryptography in C and C++," Apress, Chapter 19, pp. 357-378 (2001).

"Announcing the Advanced Encryption Standard (AES)," Federal Information Processing Standards Publication 197 (Nov. 26, 2001).

* cited by examiner

GENERATING KEYS HAVING ONE OF A NUMBER OF KEY SIZES

FIELD OF THE INVENTION

The present invention relates generally to encryption and decryption, and, more particularly, to generating keys used for encryption and decryption.

BACKGROUND OF THE INVENTION

Encryption enables data, typically called "plain text," to be coded into encrypted data, commonly called "cipher text." Without knowing particular keys, called cipher keys, cipher text cannot be converted back to plain text or plain text cannot be converted into cipher text.

The Advanced Encryption Standard (AES) defines techniques for encrypting and decrypting data. See "Specification for the Advanced Encryption Standard (AES)," Federal Information Processing Standard (FIPS) Publication 197 (2001), the disclosure of which is hereby incorporated by reference. The techniques defined by the AES are very important parts of many current computerized encryption systems, which encrypt everything from electronic mail to secret personal identification numbers (PINs).

The AES defines encryption and decryption techniques where a cipher key is used to generate a number of round keys. The round keys are used during encryption of plain text and decryption of cipher text. The AES also defines techniques for using different sizes of the cipher key and round keys during encryption and decryption. The AES defines key sizes of 128, 192, and 256 bits. Longer key sizes are beneficial, as the larger size equates with a longer period for one to perform a "brute force" code breaking approach, where each possible cipher key is tried until a correct decryption of the cipher text occurs.

While the AES defines very effective encryption and decryption techniques, there are some problems with the way keys such as round keys are generated. A need therefore exists for improved techniques for generating keys such as round keys.

SUMMARY OF THE INVENTION

Generally, techniques are presented for generating keys, used for encryption or decryption, having one of a number of key sizes.

In an exemplary embodiment, an apparatus is disclosed for generation of keys having one of a plurality of key sizes. The apparatus comprises a memory element having a number of memory sections. Each memory section is adapted to store a portion of a key. The memory element has a size at least as large as a largest key size of the plurality of key sizes, and the key has a size of one of the plurality of key sizes. Key generation logic is coupled to the memory element, where the key generation logic is adapted to generate intermediate key results for the key by operating on values from the memory sections and from the intermediate key results.

Key selection logic is coupled to the memory element, to the intermediate key results, and to control logic. The key selection logic is adapted to route, under control of the control logic, selected intermediate key results to selected ones of the memory sections.

The control logic is coupled to the key selection logic. The control logic is adapted, based at least partially on the size of the key, to select the selected intermediate key results and the selected ones of the memory sections. The selected intermediate key results comprise some or all of the key.

A more complete understanding of the present invention, as well as further features and advantages of the present invention, will be obtained by reference to the following detailed description and drawings.

DETAILED DESCRIPTION

For ease of reference, the present disclosure is divided into a number of sections: Introduction; A First Exemplary Key Expansion Block; A Second Exemplary Key Expansion Block; and an Appendix.

Introduction

As described above, the AES, already incorporated by reference above, describes techniques that generate round keys from "cipher keys." As defined in the AES, a cipher key is a "secret, cryptographic key that is used by a key expansion routine to generate a set of round keys; can be pictured as a rectangular array of bytes, having four rows and Nk columns." Round keys are "values derived from the cipher key using the key expansion routine; they are applied to the state in the cipher and inverse cipher." A "cipher" is a "series of transformations that converts plaintext to ciphertext using the cipher key," while an "inverse cipher" is a "series of transformations that converts ciphertext to plaintext using the cipher key."

Conventional systems typically use a storage mechanism to house round keys. Because a relatively large number of round keys are used for each cipher key, quite a bit of memory can be used to store the round keys. This memory takes a large amount of semiconductor area and gates. With the storage technique, the amount of memory required is high, i.e., to support all the key sizes, a system would need at least 60 locations by 32-bit memory. In an implementation using cells, approximately 70,000 gates would be needed.

A few conventional systems also demonstrate generation of the round keys during encryption or decryption, but these systems support only one key size. As defined herein, a "key size" is a number of elements, typically bits, used to house a key such as a cipher key or round key. The existing techniques of generation of round keys during encryption or decryption support only a single key size, and therefore might not be suitable for future products. For instance, as key sizes have increased over a short period of time, having a product designed to support multiple key sizes can lengthen the service life of the product and provide a product suitable for a broader range of applications with only a modest or no increase in cost.

Figure 1:
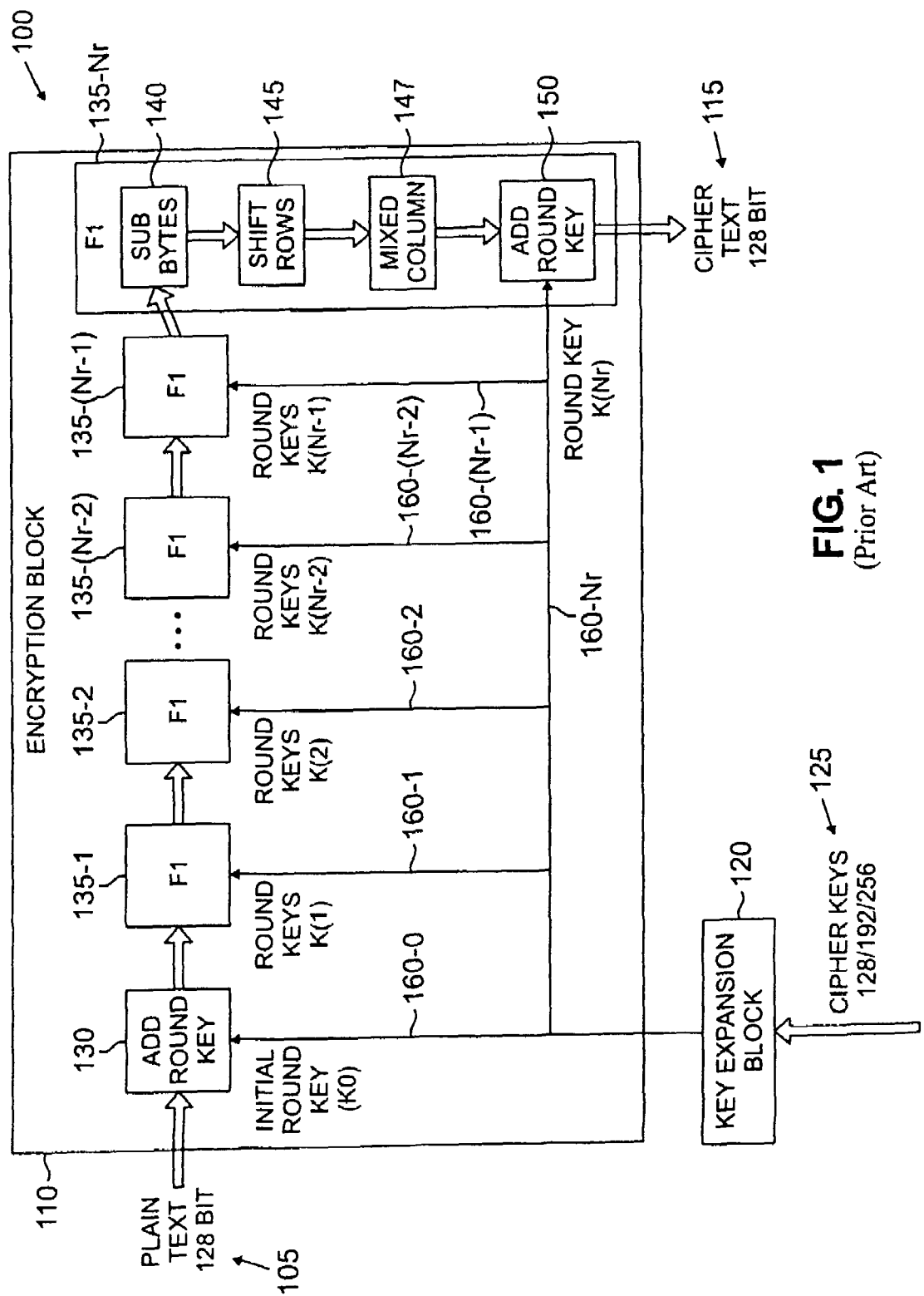
FIG. 1 shows a block diagram of an encryption module in accordance with the Advanced Encryption Standard (AES) and suitable for use with the present invention.

Referring now to FIG. 1, this figure shows a block diagram of an encryption module 100 operating in accordance with the AES and suitable for use with the present invention. Encryption module 100 comprises an encryption block 110 and a key expansion block 120. It should be noted that the encryption block 110 can be considered an algorithm block, as both encryption and decryption are similar and can be performed by one algorithm. The encryption block 110 accepts round keys 160 and encrypts 128-bit plain text 105, creating 128-bit cipher text 115. AES defines functionality for these two major blocks. The function of key expansion block 120 is to generate the round keys 160-0 through 160-Nr and supply the round keys 160 to the encryption block 110. The input to the key expansion block 120 is a user-supplied, 128-, 192- or 256-bit cipher key 125. The key size of each of the round keys 160 depends on the architecture of the encryption block 110. In the exemplary architecture of FIG. 1, the encryption block 110 is assumed to be operating with 128-bit round keys 160 every clock cycle.

The encryption block includes an add round key module 130, function F1 modules 135-1 through 135-Nr. These functions and the operation of encryption block 110 are described by the AES. Briefly, the function F1 in each of the function F1 modules 135 comprises the following functions, as illustrated by function F1 module 135:

1) A sub bytes function 140 (see section 5.1.1 of the AES);
2) A shift rows function 145 (see section 5.1.2 of the AES);
3) A mixed column function 147 (see section 5.1.3 of the AES); and
4) An add round key function 150 (see section 5.1.4 of the AES).

The add round key module 130 comprises an add round key function (see section 5.1.4 of the AES).

A typical pseudocode for an encryption operation is given below:

```
Cipher (byte in[4*Nb], byte out[4*Nb], word w[Nb*(Nr+1)])
Begin
    byte state [4,Nb]
    state = in
    AddRoundKey (state, w[0, Nb-1])
    for round = 1 step 1 to Nr-1
        SubBytes(state)
        ShiftRows(state)
        MixColumns(state)
        AddRoundKey (state, w[round*Nb, (round+1)*Nb-1])
    end for
    SubBytes(state)
    ShiftRows(state)
    AddRoundKey (state, w[Nr*Nb, (Nr+1)*Nb-1])
    out = state
end
```

Figure 2:
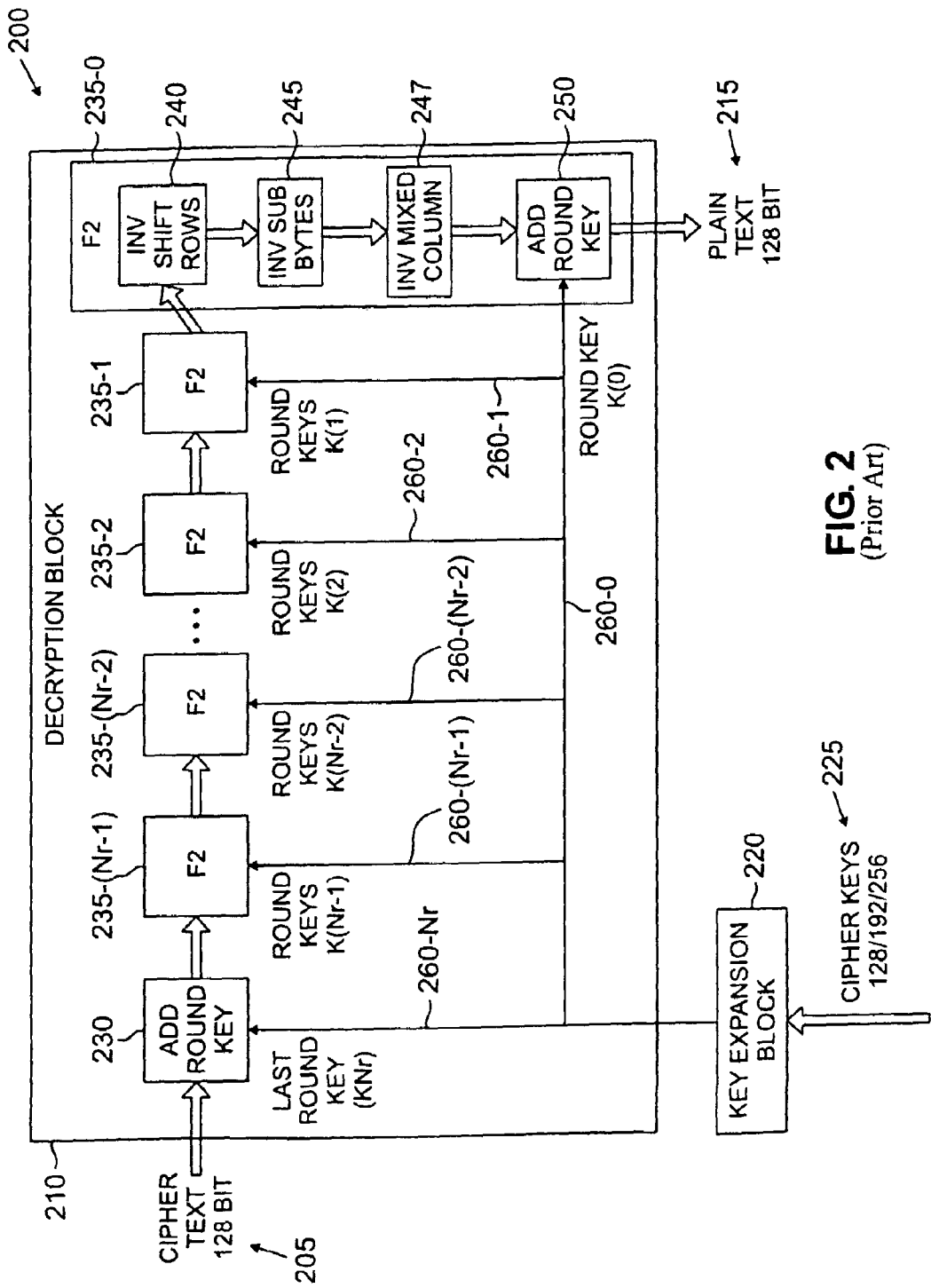
FIG. 2 shows a block diagram of a decryption module in accordance with the AES and suitable for use with the present invention.

Referring now to FIG. 2, this figure shows a block diagram of a decryption module 200 operating in accordance with the AES and suitable for use with the present invention. Decryption module 200 comprises a decryption block 210 and a key expansion block 220. It should be noted that the decryption block 210 can be considered an algorithm block, as both encryption and decryption are similar and can be performed by one algorithm. The decryption block 210 accepts 128-bit cipher text 205 in this example and creates 128-bit plain text 215 (e.g., which should be the same as plain text 105 of FIG. 1). The key expansion block 220 accepts 128-, 192- or 256-bit cipher keys 225 and generates round keys 260-0 through 260-Nr. The decryption block 210 comprises an add round key module 230, and function F2 modules 235-0 through 235-(Nr-1).

These functions and the operation of decryption block 210 are described by the AES. Briefly, the function F2 in each of the function F2 modules 235 comprises the following functions, as illustrated by function F2 module 235-0:

1) An inverse shift rows function 240 (see section 5.3.1 of the AES);
2) An inverse sub bytes function 245 (see section 5.3.2 of the AES);
3) An inverse mixed column function 247 (see section 5.3.3 of the AES); and
4) An add round key function 250 (see section 5.3.4 of the AES).

The add round key module 230 comprises an add round key function (see section 5.3.4 of the AES).

A typical pseudo code for decryption is given below.

```
InvCipher(byte in[4*Nb], byte out[4*Nb], word w[Nb*(Nr+1)])
begin
    byte state[4,Nb]
    state = in
    AddRoundKey(state, w[Nr*Nb, (Nr+1)*Nb-1])
    for round = Nr-1 step -1 downto 1
        InvShiftRows(state)
        InvSubBytes(state)
        AddRoundKey(state, w[round*Nb, (round+1)*Nb-1])
        InvMixColumns(state)
    end for
    InvShiftRows(state)
    InvSubBytes(state)
    AddRoundKey(state, w[0, Nb-1])
    out = state
end
```

Key expansion is one of the critical operations of AES. The basic round key generation is the same in both encryption and decryption as shown in FIGS. 1 and 2 and thus round keys 160 and 260 are considered to be the same. For encryption, the encryption (e.g., algorithm) block 110 starts with the first generated round key 160-1, and for decryption, the decryption (e.g., algorithm) block 210 starts with the last generated round key 260-Nr, which is equivalent to round key 160-Nr. It should be noted that most terminology used herein is explained in an Appendix or in the AES.

Pseudocode for key expansion according to the AES is as follows:

```
KeyExpansion(byte key[4*Nk], word w[Nb*(Nr+1)], Nk)
begin
    word temp
    i = 0
```

-continued

```
while (i < Nk)
    w[i] = word(key[4*i], key[4*i+1], key[4*i+2], key[4*i+3])
    i = i+1
end while
i = Nk
while (i < Nb * (Nr+1)]
    temp = w[i-1]
    if (i mod Nk = 0)
        temp = SubWord(RotWord(temp)) xor Rcon[i/Nk]
    else if (Nk > 6 and i mod Nk = 4)
        temp = SubWord(temp)
    end if
    w[i] = w[i-Nk] xor temp
    i = i + 1
end while
end
```

The AES encryption or decryption (e.g., by the encryption block 110 or the decryption block 210, respectively) takes the cipher key 125 or 225, K, and performs a key expansion routine (e.g., using a key expansion block 120 or 220) to generate a "key schedule," which is all of the round keys 160 or 260. The key expansion generates a total of Nb(Nr+1) words: the key expansion uses an initial set of Nb words, and each of the Nr rounds requires Nb words of key data. The resulting key schedule includes a linear array of four-byte words, denoted [Wi], with i in the range 0<i<Nb(Nr+1).

The key expansion of the cipher key 125 or 225 into the key schedule (e.g., round keys 160 or 260) proceeds according to the pseudocode explained in next sections.

It should be noted that the encryption module 100 and decryption module 200 can be combined into an encryption/decryption module, as is known in the art.

A First Exemplary Key Expansion Block

Figure 3:
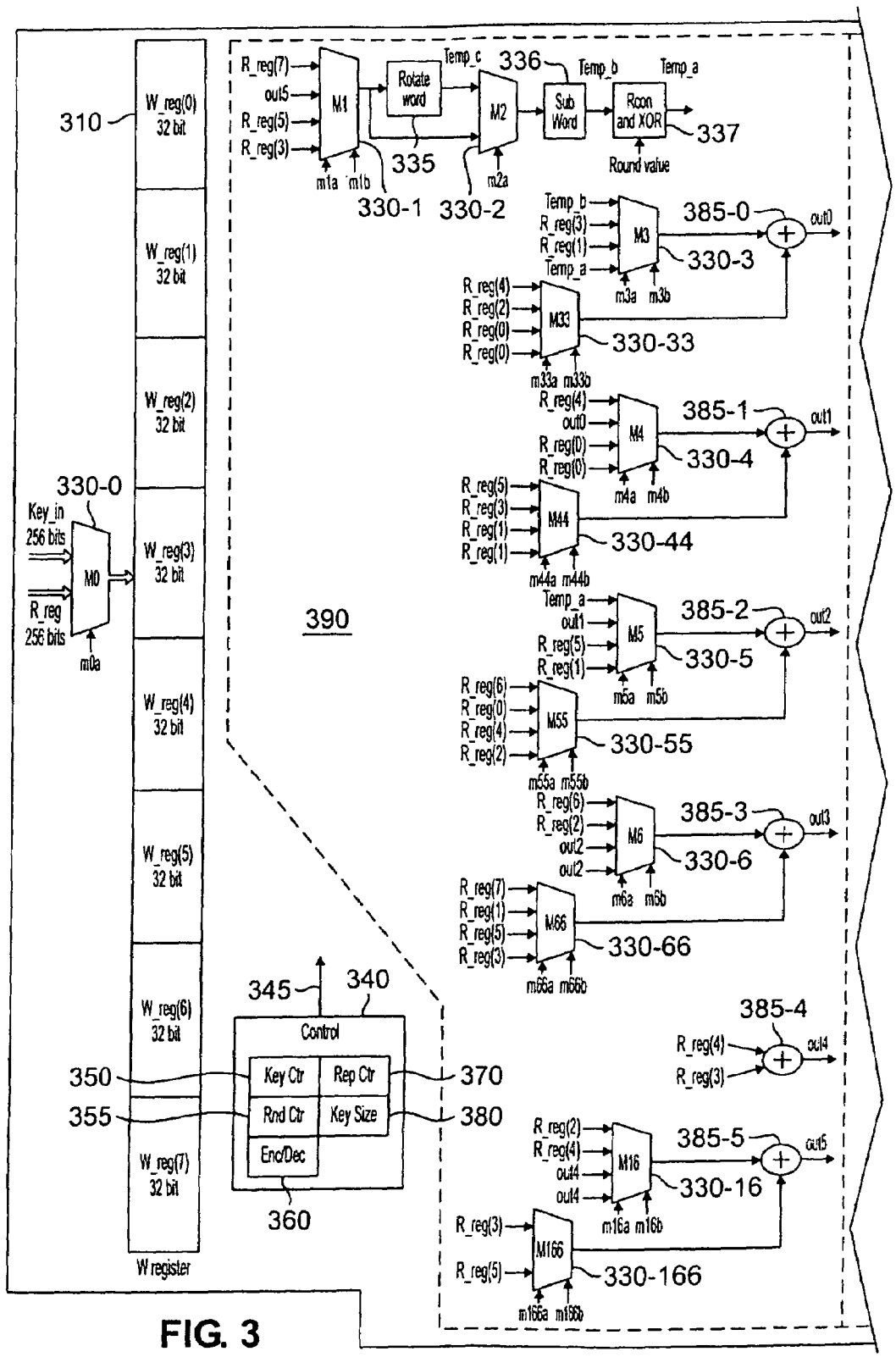
FIG. 3 is a circuit diagram of an exemplary key expansion block in accordance with a preferred embodiment of the invention.
Figure 3:
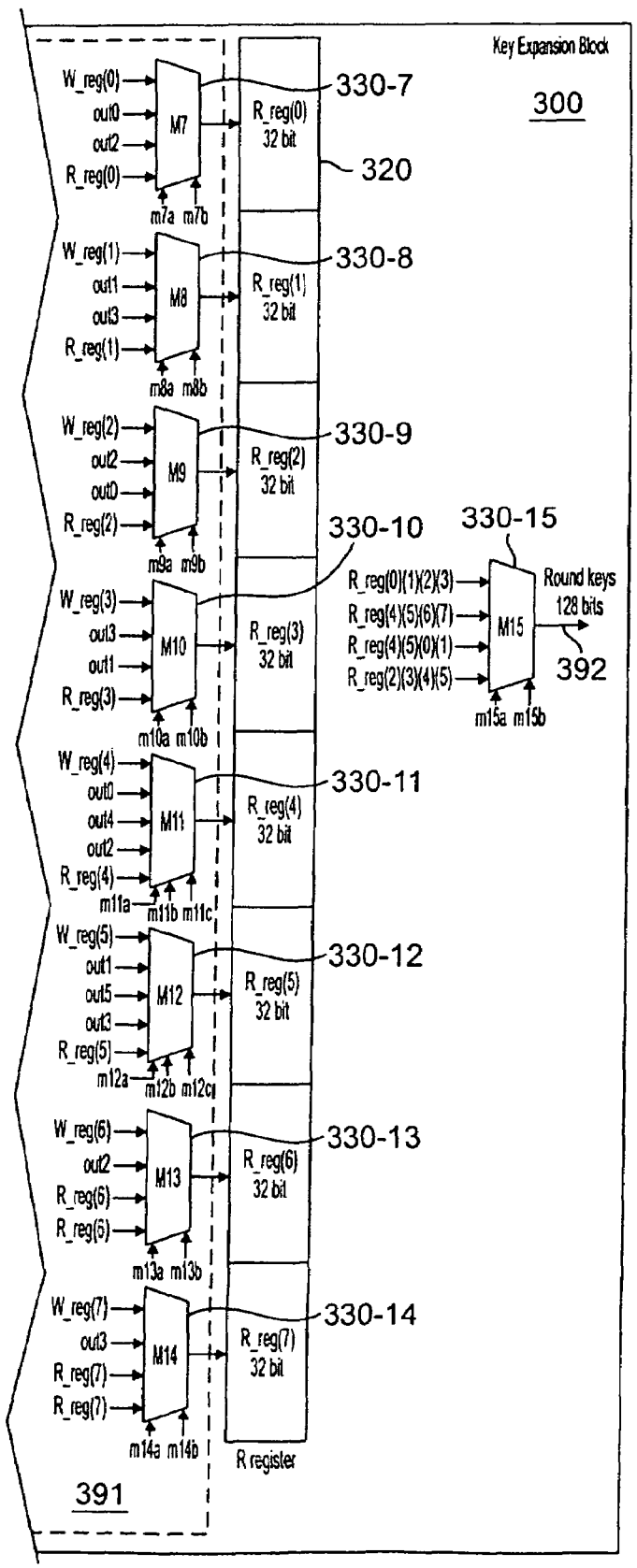

Turning now to FIG. 3, an exemplary key expansion block 300 is shown. Key expansion block 300 can be used in key expansion blocks 120 or 220. Key expansion block 300 comprises a 256-bit W register 310, a 256-bit R register 320, key generation logic 390, key selection logic 391, and a control block 340. Key generation logic comprises multiplexers 330-0 through 330-6, 330-33, 330-44, 330-55, 330-66, 330-16, and 330-166, eXclusive OR (XOR) adders 385-0 through 385-5, a rotate word module 335, a sub word module 336, an Rcon and XOR module 337. Key selection logic 391 comprises multiplexers 330-7 through 330-14. Control block 340 comprises a key counter 350, a repetition counter 370, a round counter 355, a key size register 380, and an encryption/decryption register 360. Control block 340 produces control signals 345, which are coupled to multiplexers 330. XOR adders 385-0 through 385-5 produce intermediate key results out0 through out5, respectively. The rotate word module 335 produces the output temp_c, the sub word module 336 produces the output temp_b, and the Rcon and XOR module 337 produces the output temp_c. Keys are output through output 392.

The control block 340 controls the operation of the key expansion block 300. The control block 340 will determine whether encryption or decryption (stored in the encryption/decryption register 360) is being performed and what the key size (stored in key size register 380) to be used is. The encryption/decryption register 360 and key size register 380 can be filled and controlled by a user (e.g., through an encryption module 100 or decryption module 200).

SubWord ( ) is a function, described by the AES and implemented by the sub word module 336, that takes a four-byte input word and applies the S-box (see section 5.1.1 of AES) to each of the four bytes to produce an output word. The function RotWord ( ), described by the AES and implemented by rotate word module 335, takes a word [a0, a1, a2, a3] as input, performs a cyclic permutation, and returns the word [a1, a2, a3, a0]. Rcon is described in the AES. The round constant word array, Rcon[i] in the Rcon and XOR module 337, contains the values given by [$x^{i-1}$, {00}, {00}, {00}], with $x^{i-1}$ being powers of x (x is denoted as {02}) field GF ($2^8$) (note that i starts at 1, not 0).

From pseudocode given above, it can be seen that the first Nk words of the expanded key are filled with the cipher key (e.g., cipher key 125 or 225). Every following word, W[i], is equal to the XOR of the previous word, W[i−1], and the word Nk positions earlier, W[1−Nk]. For words in positions that are a multiple of Nk, a transformation is applied to W[i−1] prior to the XOR, followed by an XOR with a round constant, Rcon[i]. This transformation includes a cyclic shift of the bytes in a word (RotWord ( )), followed by the application of a table lookup to all four bytes of the word (SubWord ( )).

It is important to note that the key expansion routine, as per the AES, for 256-bit cipher keys (Nk=8) is slightly different than for 128- and 192-bit cipher keys. If Nk=8 and i-4 is a multiple of Nk, then SubWord ( ) is applied to W[i−1] prior to the XOR.

The architecture shown in FIG. 3 is based on real-time key generation, which supports 128/192/256 key sizes and encryption/decryption. The architecture shown in FIG. 3 assumes that an encryption or decryption (e.g., or algorithm) block needs 128-bit round keys or portions thereof every clock cycle. In other words, regardless of key size, the key expansion block 300 produces 128 bits for each output. If 192-bit round keys are desired, the first 128 bits (for example) of a first 192-bit round key are output. Then, 64 bits of the first 192-bit round key and the first 64 bits of a second 192-bit round key are output as a second output of 128 bits. Finally, the last 128 bits of the second 192-bit round key are output. Similarly, it takes two outputs (for instance) of 128 bits in order to produce a single 256-bit round key. The architecture of the key expansion block 300 can be easily extended to support different bit outputs.

The key expansion block 300 has two 256-bit registers. These registers can be any type of memory element. These registers are called W register 310 and R register 320, respectively. These registers are further divided into eight 32-bit registers for simplicity, i.e., W_reg (0) through W_reg (7) and R_reg(0) through R_reg(7). The W register 310 is initially written with the cipher key given by the user. In case of an encryption, this register value will not change until a new cipher key is given. In case of decryption, the register value will be written twice, initially with the user given cipher key and then with the contents of R_reg 320 (e.g., through the mux 330-0, as controlled by the control module 340). Three different counters, the key counter 350, the round counter 355, and the repetition counter 370 are used in this design. In an exemplary embodiment, the key counter 350 and the round counter 355 are 4-bit counters, while the repetition counter 370 is a 2-bit counter. The operation of these counters is explained below.

Exemplary pseudocode for key counter 350 (note: "<=" means "assignment") is as follows:

Key_ctr <= 0 when reset
Key_ctr <= Key_ctr +1 when key_start = 1 or data_start = 1
Key_ctr <= Key_ctr +1 when Key_size = 128 and Key_ctr 9 and
    Key_ctr 1

-continued

```
Key_ctr <= Key_ctr +1 when Key_size = 192 and Key_ctr 11 and
    Key_ctr 1
Key_ctr <= Key_ctr +1 when Key_size = 256 and Key_ctr 13 and
    Key_ctr 1 else
Key_ctr <= 0
Data_start <= start signal for the reading of round keys
Key_start <= start signal only in case of decryption to generate last round
    key
```

Exemplary pseudocode for the repetition counter 370 is as follows:

```
Rep_ctr <= 0 when reset
Rep_ctr <= 0 when Key_ctr = 0
Rep_ctr <= Rep_ctr +1 when Key_size=192 and Rep_ctr =1
Rep_ctr <= Rep_ctr +1 when Key_size 128 and Rep_ctr =0 else
Rep_ctr <= 0
```

Exemplary pseudocode for the round counter 355 is as follows:

```
Round <= 0 when reset
Round <= 0 when Key_enc_dec=1 and Key_ctr = 0
Round <= Round +1 when (Key_enc_dec=1 and Key_ctr 0) and
    ((Key_size=128) or (Key_size=192 and
    Rep_ctr 0) or (Key_size = 256 and Rep_ctr 1))
Round <= 9 when Key_enc_dec = 0 and Key_size = 128 and
    Key_ctr =0
Round <= 7 when Key_enc_dec = 0 and Key_size = 192 and
    Key_ctr =0
Round <= 6 when Key_enc_dec = 0 and Key_size = 256 and
    Key_ctr =0
Round <= Round – 1 when Key_enc_dec = 0 and ((Key_size =128) or
    (Key_size = 192 and Rep_ctr 0) or
    (Key_size = 256 and Rep_ctr 0)) and Round 0 else
Round <= Round
```

Round value is a parameter needed to generate Rcon function output from the Rcon and XOR module 337. This round value is generated through the round counter 370. Selection signals for the multiplexers 330 are generated through counter values, encryption/decryption register 360 information, and key size in key size register 380.

Methods performed by the key expansion block 300 for each size of key size are explained below. In the following description, shorthand notations will be used for the multiplexers. For instance, multiplexer 330-0 will be referred to as multiplexer M0, while multiplexer 330-166 will be referred to as multiplexer M166.

For 128-bit encryption, the key expansion block 300 performs the following exemplary steps:

1) W_reg (0) to W_reg (3) will be loaded by a user-supplied 128-bit cipher key.

2) When a user wants to start the key expansion routine, the W register 310 contents will be copied to the R register 320.

3) In a second clock cycle, R_reg(3), temp_c will be input for multiplexers M1 and M2 respectively. Multiplexers M3, M33, M4, M44, M5, M55, M6, and M66 will select the inputs temp_a, R_reg(0), out0, R_reg(1), out1, R_reg(2), out2, R_reg(3), respectively. The intermediate key results Out0, out1, out2 and out3 will be a new round key. This newly generated 128-bit round key will be written into R_reg(0) to R_reg(3) with the help of multiplexers M7, M8, M9, and M10, respectively. Multiplexer M15 will select only these R_reg(0) to R_reg(3) and outputs the new 128-bit round key.

4) Step 3 will be repeated until all the round keys are generated (e.g., round keys 160-0 through 160-Nr of FIG. 1 are generated).

5) For new plain text, encryption steps 2, 3 and 4 will be repeated. For new cipher key encryption, steps 1, 2, 3 and 4 will be repeated.

For 128-bit decryption, the key expansion block 300 performs the following exemplary steps:

1) Steps 1, 2, 3 and 4 of "128-bit encryption" above will be repeated.

2) The W register 310 will be rewritten with R_reg 320.

3) R_reg(2) and R_reg(3) will be input to multiplexers M16 and M166. Out5 and temp_c will be input to multiplexers M1 and M2. Multiplexers M3, M33, M4, M44, M5, M55, M6, and M66 will select the inputs temp_a, R_reg(0), R_reg (0), R_reg(1), R_reg(1), R_reg(2), R_reg(2), and R_reg(3), respectively. Multiplexers M7, M8, M9, and M10 will select the intermediate key results of out0, out1, out2 and out3, respectively. The newly generated 128-bit round key will be written into R_reg(0) to R_reg(3). Multiplexer M15 will select R_reg(0) to R_reg(3) and will output the newly generated 128-bit round key.

4) Step 3 will be repeated until the first round key (e.g., round key 260-0 of FIG. 2) is generated.

5) Steps 3 and 4 will be repeated for next cipher text and the W register 310 will be copied to the R register 320.

6) Steps 1 to 5 will be repeated if cipher key changes.

For 192-bit encryption, the key expansion block 300 performs the following exemplary steps:

1) W_reg (0) to W_reg (5) will be loaded by a user-supplied 192 bit cipher key.

2) When a user wants to start key expansion routine, these W register 310 contents will be copied to the R register 320.

3) In a second clock cycle, R_reg(5), temp_c will be input for multiplexer M1 and M2 respectively. Multiplexers M3, M33, M4, M44, M5, M55, M6, and M66 will select the inputs temp_a, R_reg(0), out0, R_reg(1), out1, R_reg(2), out2, R_reg(3), respectively. The intermediate key results out0, out1, out2 and out3 will generate 128 bits of a round key. This newly generated 128 bits will be written into R_reg(0) to R_reg(3) with the help of multiplexers M7, M8, M9, and M10, respectively. Multiplexer M15 selects R_reg(0) to R_reg(3) and outputs 128 bits of a first 192-bit round key.

4) In the third clock cycle, out4 and R_reg(5) will be input for multiplexers M16 and M166, respectively. Out5 and temp_c will be input for multiplexers M1 and M2. Temp_a, R_reg(4), out0, R_reg(5) will be respective inputs to multiplexers M3, M33, M4, and M44. The intermediate key results out4, out5, out1 and out2 will be selected by multiplexer M11, M12, M7 and M8 and stored in R_reg(4), R_reg(5), R_reg(1) and R_reg(2). Multiplexer M15 will select R_reg(4), R_reg (5), R_reg(1) and R_reg(2) and output 128 bits, of which 64 bits (e.g., R_reg(4) and R_reg(5)) correspond to the first 192-bit round key and 64 bits (e.g., R_reg(1) and R_reg(2)) correspond to a second 192-bit round key.

5) In the forth clock cycle, R_reg(1), R_reg(2), out0, R_reg (3), out1, R_reg(4), out2 and R_reg(5) will be input for multiplexers M3, M33, M4, M44, M5, M55, M6 and M66, respectively. The intermediate key results out0, out1, out2 and out3 will be selected by multiplexer M9, M10, M11 and M12, respectively. These values will be stored in register R_reg(2), R_reg(3), R_reg(4) and R_reg(5), respectively. Multiplexer M15 will select R_reg(2), R_reg(3), R_reg(4) and R_reg(5) and output 128 bits that correspond to the second 192-bit round key.

6) Steps 3, 4, and 5 will be repeated until all the round keys are generated (e.g., round keys 160-0 through 160-Nr of FIG. 1 are generated).

7) For new plain text encryption, steps 2, 3, 4, 5, and 6 will be repeated. For new cipher key encryption, steps 1, 2, 3, 4, 5, and 6 will be repeated.

For 192-bit decryption, the key expansion block 300 performs the following exemplary steps:

1) Steps 1, 2, 3, 4, 5 and 6 of "192 bit encryption" above will be repeated.

2) The W register 320 will be rewritten with the last generated 192-bit round key.

3) In a second clock cycle, inputs to multiplexer M9, M10, M11, M12 will be out2, out3, out4 and out5, respectively. R_reg(1), R_reg(2), R_reg(2), R_reg(3), R_reg(4) and R_reg (5) will be respective inputs to multiplexers M5, M55, M6, M66, M16, and M166. Multiplexers M9, M10, M11, M12 will select the intermediate key results out2, out3, out4 and out5. The newly generated 128 bits of a first 192-bit round key will be written into R_reg(2) to R_reg(5). Multiplexer M15 will select R_reg(0) to R_reg(3) and output 128 bits of the first 192-bit round key. In decryption, since there is already a meaningful round key from the last round of encryption (e.g., a final key created by encryption), this previously created round key has to be read first, then the newly generated key will be read. Hence, in the second clock cycle, M15 will select R_reg(0) to R_reg(3) then in the next (e.g., third) clock cycle, M 15 will select those round keys which are written in the second clock cycle. Hence in the third clock cycle, as described below, M15 will select R_reg(2) to R_reg(5).

4) In the third clock cycle, multiplexers M11, M12, M7, M8 will select out4, out5, out0, out1, respectively. The inputs to multiplexers M16, M166, M3, M33, M4, M44, M1 will be R_reg(4), R_reg(5), temp_a, R_reg(0), R_reg(0), R_reg(1), and R_reg(5), respectively. Generated round keys will be stored in register R_reg(4), R_reg(5), R_reg(0) and R_reg(1). Multiplexer M15 will select R_reg(2) to R_reg(5) and output 128 bits, of which 64 bits correspond to the first 192-bit round key and the other 64 bits correspond to a second 192-bit round key.

5) In the forth clock cycle, multiplexer M9, M10, M11, M12 will select out2, out3, out4, out5, respectively. The inputs to multiplexers M5, M55, M6, M66, M16, M166 will be R_reg(1), R_reg(2), R_reg(2), R_reg(3), R_reg(4), R_reg (5). Generated round keys will be stored in register R_reg(2), R_reg(3), R_reg(4) and R_reg(5). Multiplexer M15 will select R_reg(4), R_reg(5), R_reg(0) and R_reg(1) and output the newly generated 128 bits, which are the rest of the bits necessary for the second 192-bit round key.

6) Steps 3, 4, 5 will be repeated until the first round key (e.g., round key 260-0 of FIG. 2) is generated.

7) Steps 3, 4, 5, 6 will be repeated for next cipher text and W register 310 will be copied to R register 320.

8) Steps 1 to 6 will be repeated if cipher key changes.

For 256-bit encryption, the key expansion block 300 performs the following exemplary steps:

1) W_reg (0) to W_reg (7) will be loaded by a user-supplied 256-bit cipher key.

2) When a user wants to start key expansion routine, the W register 310 contents will be copied to the R register 320.

3) In a second clock cycle, R_reg(7), temp_c will be input to multiplexers M1 and M2, respectively. Multiplexers M3, M33, M4, M44, M5, M55, M6 and M66 will select the inputs temp_a, R_reg(4), out0, R_reg(1), out1, R_reg(2), out2 and R_reg(3) respectively. out0, out1, out2 and out3 will generate a 128-bit portion of a 256-bit round key. This newly generated 128 bits will be written into R_reg(0) to R_reg(3) with the help of multiplexers M7, M8, M9 and M10, respectively. Multiplexer M15 will select R_reg(0) to R_reg(3) and output the 128 bits of the 256-bit round key.

4) In a third clock cycle, R_reg(3) and m1, which is the output of multiplexer M1, will be input to multiplexers M1 and M2, respectively. Temp_b, R_reg(4), out0, R_reg(5), out1, R_reg(6), out2 and R_reg(7) will be respective inputs to multiplexers M3, M33, M4, M44, M5, M55, M6 and M66. The intermediate key results out0, out1, out2 and out3 will be selected by multiplexers M11, M12, M13 and M14, respectively, and will be stored in registers R_reg(4), R_reg(5), R_reg(6) and R_reg(7). Multiplexer M15 will select R_reg (4), R_reg(5), R_reg(6) and R_reg(7) and output the other 128 bits of the 256-bit round key.

5) Steps 3 and 4 will be repeated until all the round keys are generated (e.g., round keys 160-0 through 160-Nr of FIG. 1 are generated).

6) For new plain text encryption, steps 2, 3, 4, and 5 will be repeated. For new cipher key encryption, steps 1, 2, 3, 4, and 5 will be repeated.

For 256-bit decryption, the key expansion block 300 performs the following exemplary steps:

1) Steps 1, 2, 3, 4 and 5 of "256-bit encryption" above will be repeated.

2) The W register 310 will be rewritten with 256 bits of a round key from R register 320.

3) R_reg(2) and R_reg(3) will be input to multiplexers M16 and M166, respectively. R_reg(3) and m1 will be input to multiplexers M1 and M2. Multiplexers M3, M33, M4, M44, M5, M55, M6 and M66 will select the inputs temp_b, R_reg(4), R_reg(4), R_reg(5), R_reg(5), R_reg(6), R_reg(6) and R_reg(7) respectively. The intermediate key results out0, out1, out2 and out3 will be the newly generated portion of a 256-bit round key. This newly generated 128-bit portion of a 256-bit round key will be written into R_reg(4) to R_reg(7) with the help of multiplexers M11, M12, M13 and M14, respectively. Multiplexer M15 will select only the registers R_reg(0) to R_reg(3) and output the first 128-bit portion of the 256-bit round key.

4) In the third clock cycle, R_reg(7) and temp_c will be input to multiplexers M1 and M2, respectively. Multiplexers M3, M33, M4, M44, M5, M55, M6 and M66 will select the inputs temp_a, R_reg(0), R_reg(0), R_reg(1), R_reg(1), R_reg(2), R_reg(2) and R_reg(3) respectively. The intermediate key results out0, out1, out2 and out3 will be the newly generated 128-bit portion of the 256-bit round key. This newly generated 128-bit portion of the 256-bit round key will be written into R_reg(0) to R_reg(3) with the help of multiplexers M7, M8, M9 and M10. Multiplexer M15 will select only the registers R_reg(4) to R_reg(7) and output the second 128-bit portion of the 256-bit round key.

5) Steps 3 and 4 will be repeated until the first round key (e.g., round key 260-0 of FIG. 2) is generated.

6) Steps 3, 4 and 5 will be repeated for the next cipher text and the W register 310 will be copied to the R register 320.

7) Steps 1 to 5 will be repeated if the cipher key changes.

A key expansion block, such as key expansion block 300, is an important block of any AES implementation. As discussed before, the conventional storage techniques consumes more silicon area as compared to the key expansion block 300, because all the generated round keys are stored. In the proposed exemplary architecture, the round keys are generated real-time without any performance penalty and with minimum silicon area. It is to be noted that this architecture supports all the key sizes of AES and also encryption and decryption modes of operation. There are no extra wait states when operated in the decryption mode, as the last round key (which is the starting point for decryption) is computed and stored in the W register 310.

The architecture of FIG. 3 can also be extended to provide 32-, 64- or 96-bit (or greater than 256-bit) round keys by modifying the configuration of the counters and the multiplexer M15.

While simulating the exemplary architecture of FIG. 3, the storage-based architecture was also implemented. For storing the round keys, flip-flops were used. The table, given below, gives the gate count obtained from synthesis runs for both the implementations.

|  | Storage based architecture | Architecture of FIG. 3 | Savings |
|---|---|---|---|
| Area (Gate count) | 73 K | 14 K | 80% |

From the above table, it is evident that the savings in the gate count with the proposed architecture is quite large.

A Second Exemplary Key Expansion Block

Figure 4:
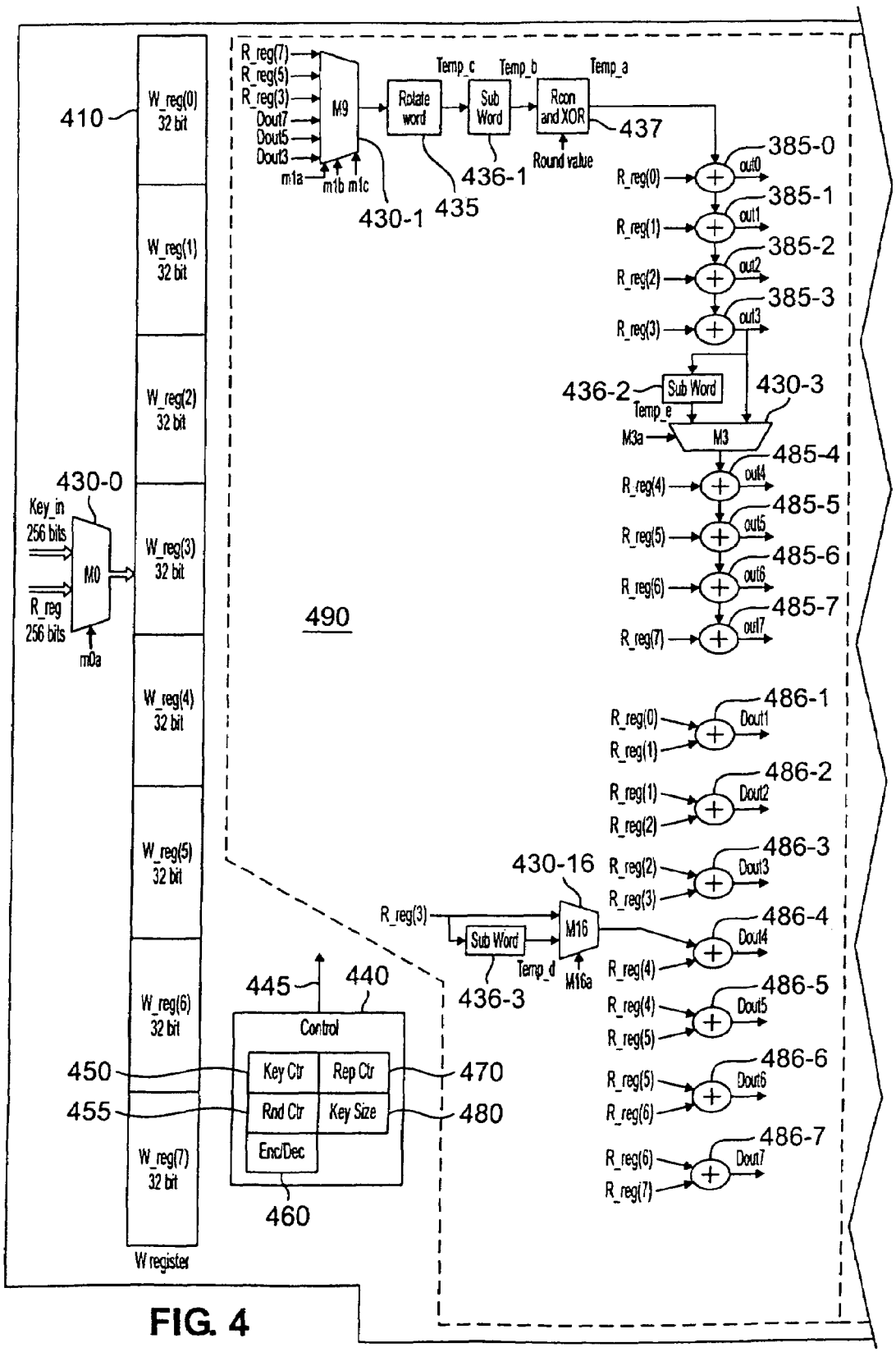
FIG. 4 is circuit diagram of a second exemplary key expansion block in accordance with a preferred embodiment of the invention.
Figure 4:
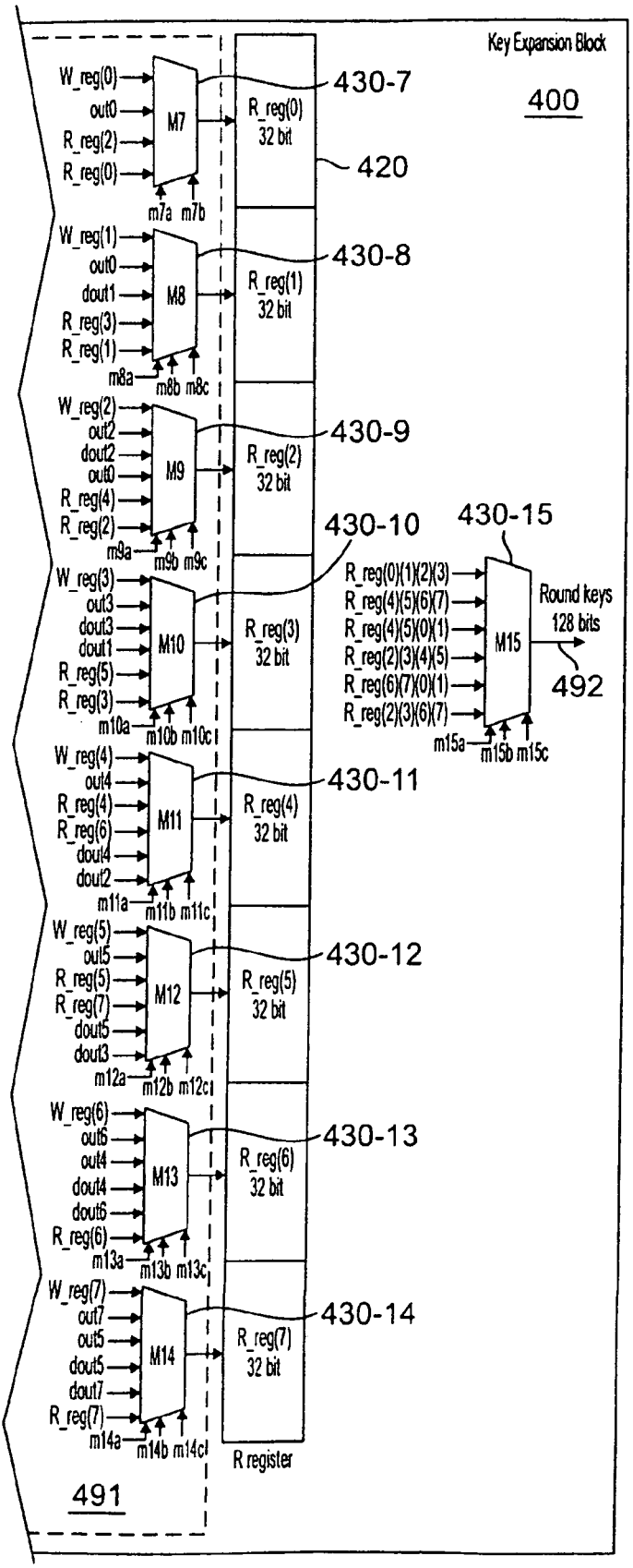
Figure 5:
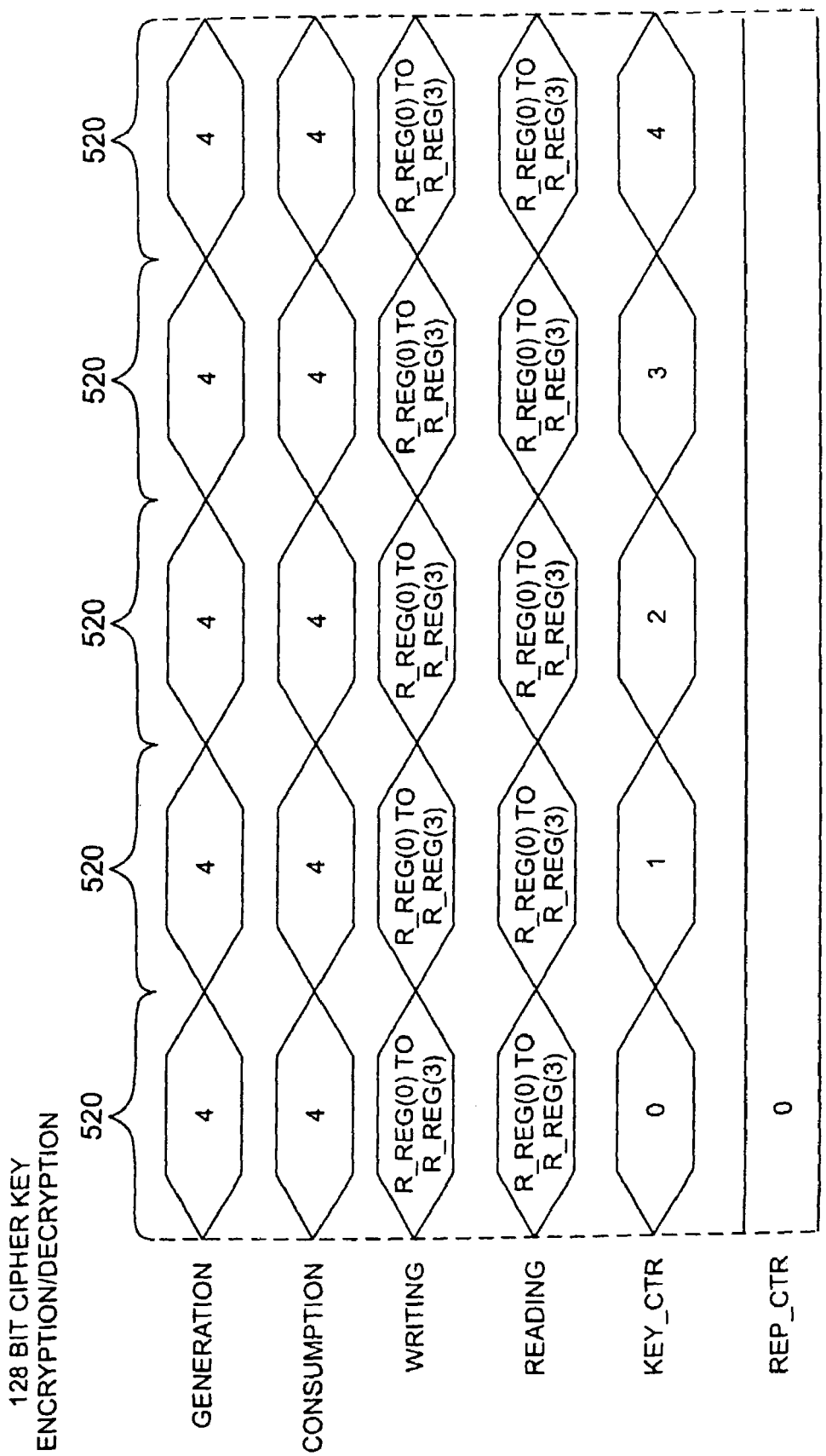
FIG. 5 is an exemplary timing diagram illustrating timing for certain signals for 128-bit cipher key encryption and decryption using the circuit of FIG. 4.
Figure 6A:
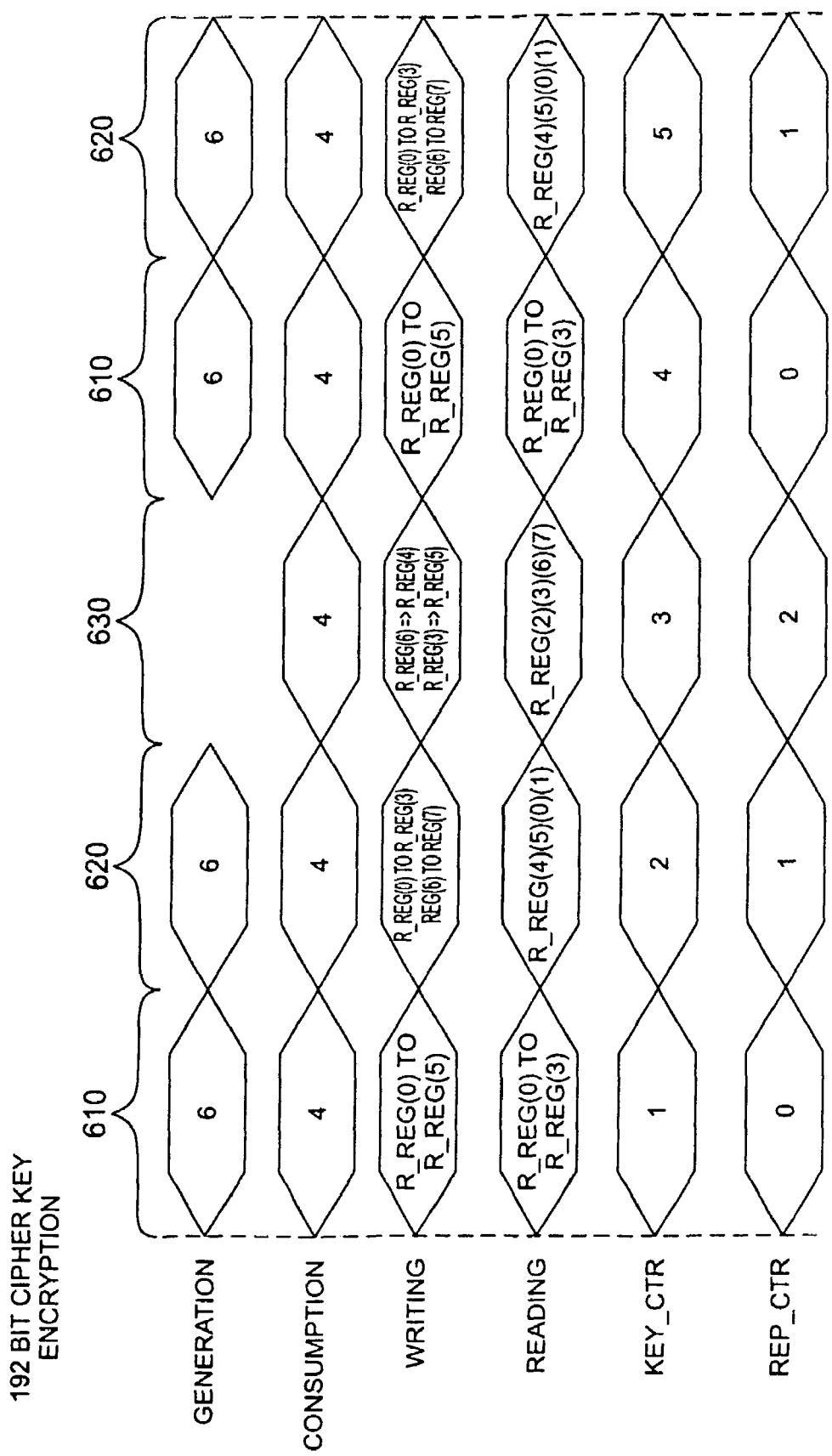
FIG. 6A is an exemplary timing diagram illustrating timing for certain signals for 192-bit cipher key encryption using the circuit of FIG. 4.
Figure 6B:
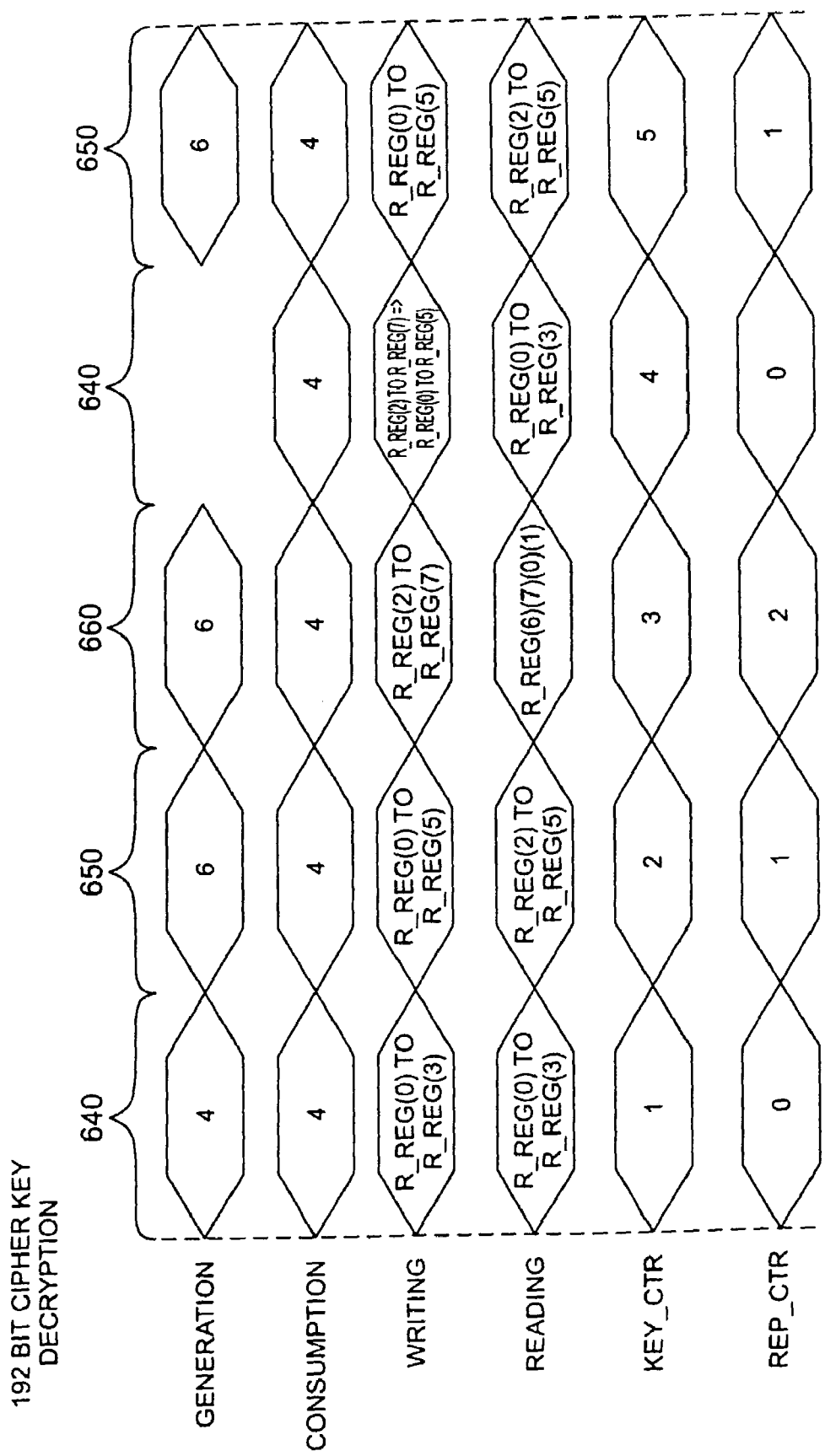
FIG. 6B is an exemplary timing diagram illustrating timing for certain signals for 192-bit cipher key decryption using the circuit of FIG. 4.
Figure 7A:
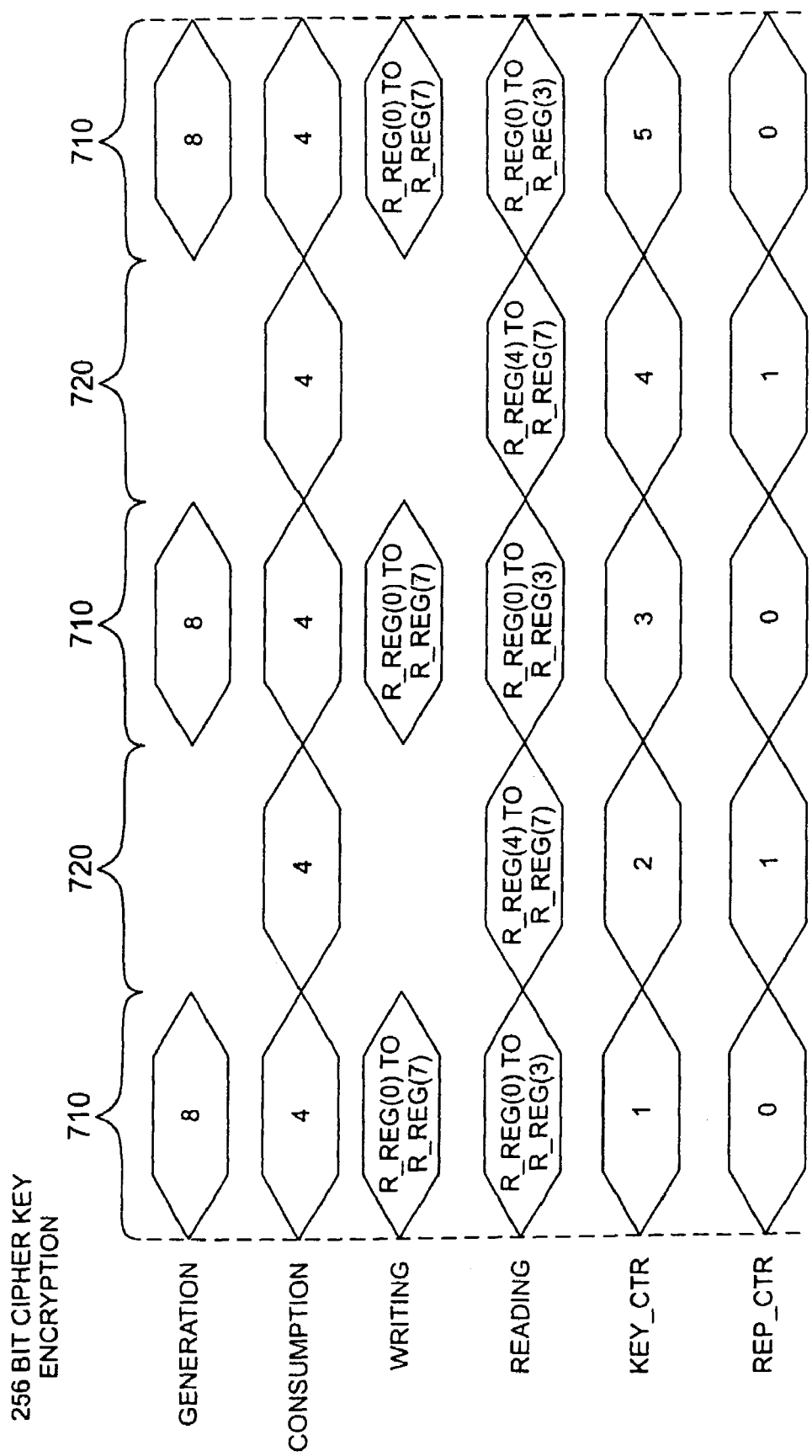
FIG. 7A is an exemplary timing diagram illustrating timing for certain signals for 256-bit cipher key encryption using the circuit of FIG. 4.
Figure 7B:
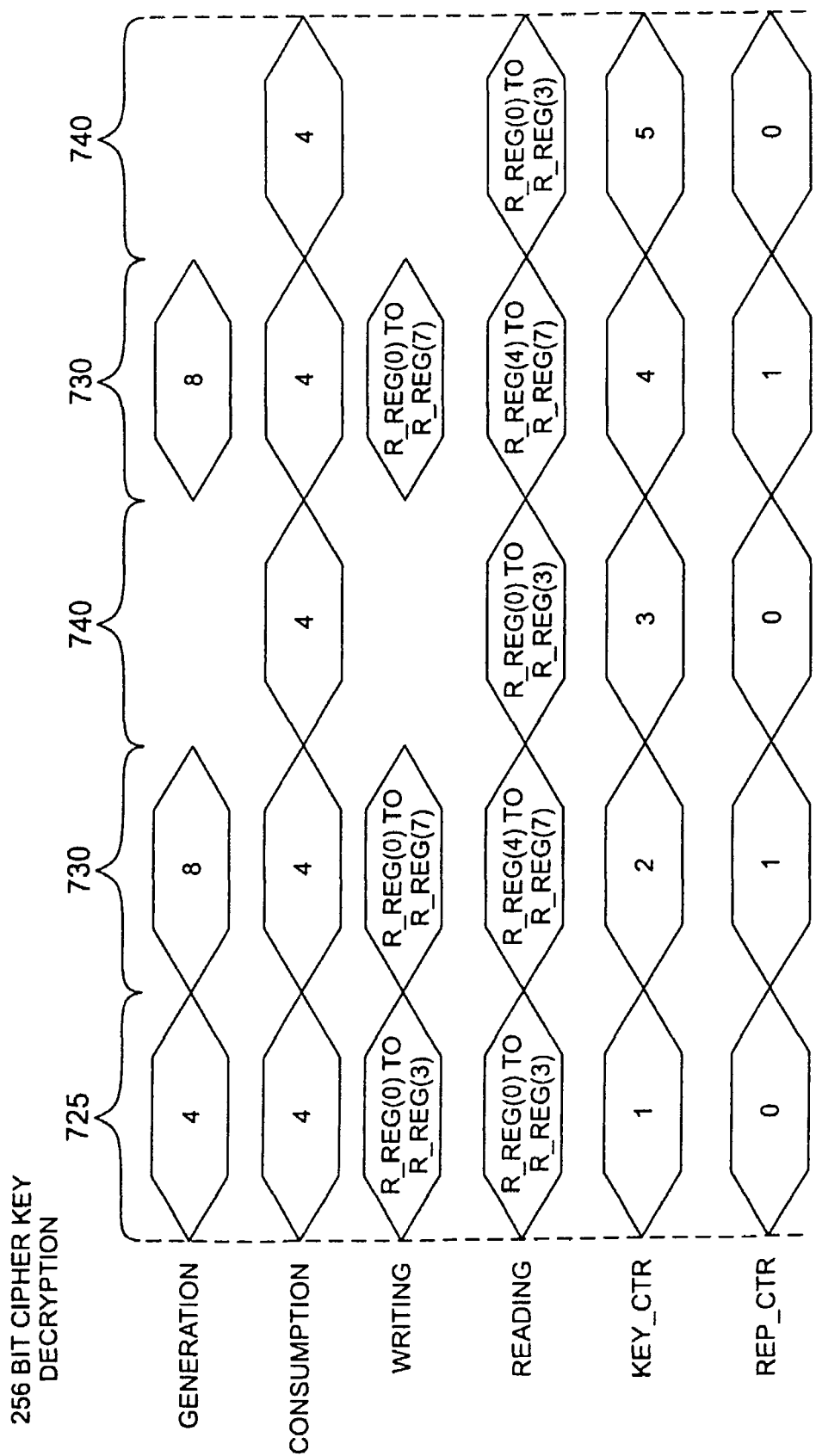
FIG. 7B is an exemplary timing diagram illustrating timing for certain signals for 256-bit cipher key decryption using the circuit of FIG. 4.

FIG. 4 is circuit diagram of a second exemplary key expansion block 400 in accordance with a preferred embodiment of the invention. Key expansion block 400 can be used in key expansion blocks 120 or 220. Key expansion block 400 comprises a 256-bit W register 410, a 256-bit R register 420, key generation logic 490, key selection logic 491, and a control block 440. The Key generation logic comprises multiplexers 430-0, 430-1, 430-3, 430-15, and 430-16, XOR adders 385-0 through 385-7 and 366-1 through 386-7, a rotate word module 435, sub word modules 436-1 through 436-3, and an Rcon and XOR module 437. Key selection logic 491 comprises multiplexers 430-7 through 430-14. Control block 440 comprises a key counter 450, a repetition counter 470, a round counter 455, a key size register 480, and an encryption/decryption register 460. Control block 440 produces control signals 445, which go to multiplexers 430. The XOR adders 485-0 through 485-7 produce intermediate key results out0 through out7, respectively. Additionally, the XOR adders 486-1 through 486-7 produce intermediate key results Dout1 through Dout7, respectively. The rotate word module 435 produces the output temp_c, the sub word module 436-1 produces the output temp_b, the Rcon and XOR module 437 produces output temp_a, the sub word module 436-2 produces the temp_e output, and the sub word module 436-3 produces the temp_d output. Keys are output through output 492.

The control block 440 controls the operation of the key expansion block 400. The control block 440 will determine whether encryption or decryption is being performed (stored in the encryption/decryption register 460) and what the key size (stored in key size register 480) to be used is. The encryption/decryption register 460 and key size register 480 can be filled and controlled by a user (e.g., through an encryption module 100 or decryption module 200).

The rotate word module 435, sub word modules 436-1 through 436-3, and Rcon and XOR module 437 are as described above in reference to rotate word module 335, sub word module 336, and Rcon and XOR module 337, respectively.

Similar to FIG. 3, the W register 410 and R register 420 registers are further divided into eight 32-bit registers for simplicity, i.e., W_reg (0) through W_reg (7) and R_reg(0) through R_reg(7), respectively. The W register 410 is initially written with the cipher key supplied by the user. In case of an encryption, this register value will not change until a new cipher key is given. In case of decryption, the register value will be written twice, initially with the user-supplied cipher key and then with the contents of R_reg. In an exemplary embodiment, the key counter 450 and round counter 455 are 4-bit counters, while the repetition counter 470 is a 2-bit counter. The operation of these counters is explained below.

Exemplary pseudocode for the key counter 450 is as follows:

```
Key_ctr <= 0 when reset
Key_ctr <= Key_ctr +1 when key_start=1 or data_start =1
Key_ctr <= Key_ctr +1 when Key_size = 128 and Key_ctr 9 and
    Key_ctr 1
Key_ctr <= Key_ctr +1 when Key_size = 192 and Key_ctr < 9 and
    Key_ctr 1 and rep_ctr 1
Key_ctr <= 0 when key_size 256 and key_ctr 9
Key_ctr <= Key_ctr +1 when Key_size = 256 and Key_ctr 7 and
    Key_ctr 1 and rep_ctr = 1
Key_ctr <= 0 when key_size = 256 and key_ctr = 8 else
Key_ctr <= Key_ctr
Data_start <= start signal for the reading of round keys
Key_start <= start signal only in case of decryption to generate last round
    key
```

Exemplary pseudocode for the repetition counter 470 is as follows:

```
Rep_ctr <= 0 when reset
Rep_ctr <= 0 when Key_ctr = 0
Rep_ctr <= Rep_ctr +1 when Key_size = 192 and Rep_ctr = 1
Rep_ctr <= Rep_ctr +1 when Key_size = 256 and Rep_ctr = 0 else
Rep_ctr <= 0
```

Exemplary pseudocode for the round counter 455 is as follows:

```
Round <= 0 when reset
Round <= 0 when Key_enc_dec=1 and Key_ctr = 0
Round <= Round +1 when (Key_enc_dec=1 and Key_ctr 0) and
    ((Key_size=128) or (Key_size=192 and
    Rep_ctr 1) or (Key_size = 256 and Rep_ctr =1))
Round <= 9 when Key_enc_dec = 0 and Key_size = 128 and
    Key_ctr =0
Round <= 7 when Key_enc_dec = 0 and Key_size = 192 and
    Key_ctr =0
Round <= 6 when Key_enc_dec = 0 and Key_size = 256 and
    Key_ctr =0
Round <= Round −1 when Key_enc_dec = 0 and ((Key_size =128) or
    (Key_size=192 and Rep_ctr 2) or
    (Key_size = 256 and Rep_ctr 0)) and Round 0 else
Round <= Round
```

The following table shows how cipher key size is related to generation and consumption rates for round keys for FIG. 4. These are explained in more detail in reference to FIGS. 5, 6A, 6B, 7A, and 7B. However, the key expansion block 400, unlike key expansion block 300, will have generation of round keys stopped periodically when generating 192-bit or 256-bit round keys.

| Cipher Key Size | Generation Rate | Consumption Rate |
|---|---|---|
| 128 bits | 128-bits per clock cycle | 128-bit per clock cycle |
| 192 | After every two clock cycles, generation is stopped for one clock cycle. Generation logic always generates 192-bit keys. | 128-bit per clock cycle |

-continued

| Cipher Key Size | Generation Rate | Consumption Rate |
|---|---|---|
| 256 | Every alternate clock cycle, the generation is stopped for one clock cycle. Generation logic always generates 256-bit keys. | 128-bit per clock cycle |

Methods performed by the key expansion block 400 for each size of key size are explained below. In the following description, shorthand notations will be used for the multiplexers. For instance, multiplexer 430-0 will be referred to as multiplexer M0, while multiplexer 430-166 will be referred to as multiplexer M166.

FIGS. 5, 6A, 6B, 7A and 7B will be referred to below when describing encryption and decryption using FIG. 4. These figures show how many 32-bit registers are generated and consumed each cycle, which registers are written and read each cycle, and the status of the signals key_ctr (e.g., key counter) and rep_ctr (repetition counter).

For 128-bit encryption, the key expansion block 400 performs the following exemplary steps (refer to both FIG. 4 and FIG. 5, which is an exemplary timing diagram illustrating timing for certain signals for 128-bit cipher key encryption and decryption using the circuit of FIG. 4):

1) W_reg(0) to W_reg(3) will be loaded by a user-supplied 128-bit cipher key.
2) When a user wants to start a key expansion routine, the W register 410 contents will be copied to the R register 420.
3) In a second clock cycle 520, R_reg(3) will be input for multiplexer M1. Out0, out1, out2 and out3 will be the newly generated round key. This newly generated 128-bit round key will be written into R_reg(0) to R_reg(3) with the help of multiplexers M7, M8, M9 and M10, respectively. Multiplexer M15 will select only the registers R_reg(0) to R_reg(3) and outputs a 128-bit round key.
4) Step 3 will be repeated until all the round keys are generated (e.g., round keys 160-0 through 160-Nr of FIG. 1 are generated).
5) For new plain text encryption, steps 2, 3, and 4 will be repeated. For new cipher key encryption, steps 1, 2, 3, and 4 will be repeated.

For 128-bit decryption, the key expansion block 400 performs the following exemplary steps (refer to both FIG. 4 and FIG. 5):

1) Steps 1, 2, 3 and 4 of "128-bit encryption" using the key expansion block 400 will be repeated.
2) The W register 410 will be rewritten with R_reg 420.
3) Dout3 will be input to multiplexer M1 and multiplexer M1 will generate out1. Multiplexers M7, M8, M9, M10 will select the intermediate key results out0, Dout1, Dout2 and Dout3, respectively. The newly generated 128-bit round key will be written into registers R_reg(0) to R_reg(3). Multiplexer M15 will select R_reg(0) to R_reg(3) and output a 128-bit round key in cycle 520.
4) Step 3 will be repeated until the first round key (e.g., round key 260-0 of FIG. 2) is generated.
5) Steps 3 and 4 will be repeated for the next cipher text and the W register 410 will be copied to the R register 420.
6) Steps 1 to 5 will be repeated if cipher key changes.

For 192-bit encryption, the key expansion block 400 performs the following exemplary steps (refer to both FIG. 4 and FIG. 6A, which is an exemplary timing diagram illustrating timing for certain signals for 192-bit cipher key encryption using the circuit of FIG. 4):

1) W_reg(0) to W_reg(5) will be loaded by a user-supplied 192-bit cipher key.
2) When a user wants to start a key expansion routine, the W register 410 contents will be copied to the R register 420.
3) If key_ctr is zero, then in first clock cycle 610, contents of W register 410 will be copied to R register 420 with the help of multiplexers M7 to M12, respectively. Otherwise, R_reg (5) will be input to multiplexer M1 and out0 to out5 will be selected by multiplexers M7 to M12, respectively. At this point, the 192 bits of a first 192-bit round key have been generated and reside in the registers R_reg(0) through R_reg (5). In any case, multiplexer M15 will select R_reg(0) to R_reg(3) and output 128 bits of the first 192-bit round key.
4) In a second clock cycle 620, R_reg(5) will be input to multiplexer M1. The intermediate key results out0, out1, out2, out3, out4 and out5 will generate a second 192-bit round key. This newly generated 192 bit round key will be written into R_reg(0) to R_reg(3), R_reg(6), and R_reg(7) with the help of multiplexers M7, M8, M9, M10, M11 and M12, respectively. Multiplexer M15 will select R_reg(4), R_reg(5), R_reg(0) and R_reg(1) and output 128 bits, of which 64 bits (e.g., R_reg(4) and R_reg(5)) correspond to the first 192-bit round key and the other 64 bits (e.g., R_reg(0) and R_reg(1)) correspond to the second 192-bit round key.
5) In a third clock cycle 630, contents of register R_reg(6) and R_reg(7) will be copied into register R_reg(4), and R_reg (5) respectively. Multiplexer M15 will select R_reg(2), R_reg (3), R_reg(6) and R_reg(7) and sends 128-bit round key.
6) Steps 3, 4 and 5 (and therefore cycles 610, 620, 630) will be repeated until all the round keys are generated (e.g., round keys 160-0 through 160-Nr of FIG. 1 are generated).
7) For new plain text encryption, steps 2, 3, 4, 5, and 6 will be repeated. For new cipher key encryption, steps 1, 2, 3, 4, 5, and 6 will be repeated.

For 192-bit decryption, the key expansion block 400 performs the following exemplary steps (refer to both FIG. 4 and FIG. 6B, which is an exemplary timing diagram illustrating timing for certain signals for 192-bit cipher key decryption using the circuit of FIG. 4):

1) Steps 1, 2, 3, 4, 5, and 6 of "192 bit encryption" above using the key expansion block 400 will be repeated.
2) The W register 410 will be rewritten with last-generated 192 bit round key.
3) In a second clock cycle 640, if key_ctr is less than two, then no round key will be generated. Otherwise, register R_reg(2) to R_reg(7) values will be shifted to register R_reg (1) to R_reg(5). In any case, multiplexer M15 will select R_reg(0) to R_reg(3) and output 128 bits of a first 192-bit round key.
4) In a third clock cycle 650, input to multiplexer M1 will be Dout5. Multiplexers M7, M8, M9, M10, M11, M12 will select the intermediate key results out0, Dout1, Dout2, Dout3, Dout4 and Dout5, respectively. The newly generated portion or all of the 192-bit round key will be written into R_reg(0) to R_reg(5). Multiplexer M15 will select R_reg(2) to R_reg(5) and output 128 bits, which are the remaining 64 bits of the first 192-bit round key and 64 bits of a second 192-bit round key.
5) In a fourth clock cycle 660, input to multiplexer M1 will be the intermediate key result Dout5. Multiplexers M7, M8, M9, M10, M11, M12 will select the intermediate key results out0, Dout1, Dout2, Dout3, Dout4 and Dout5. This newly generated 192-bit round key will be written into R_reg(2) to R_reg(7). Multiplexer M15 will select R_reg(6), R_reg(7), R_reg(0) and R_reg(1) to output 128 bits of the second 192-bit round key.
6) Steps 3, 4, and 5 will be repeated until the first round key (e.g., round key 260-0 of FIG. 2) is generated.

7) Steps 3, 4, 5, and 6 will be repeated for next cipher text and the W register 410 will be copied to the R register 420.

8) Step 1 to 6 will be repeated if cipher key changes.

For 256-bit encryption, the key expansion block 400 performs the following exemplary steps (refer to both FIG. 4 and FIG. 7A, which is an exemplary timing diagram illustrating timing for certain signals for 256-bit cipher key encryption using the circuit of FIG. 4):

1) W_reg(0) to W_reg(7) will be loaded by a user-supplied 256 bit cipher key.

2) When a user wants to start a key expansion routine, the W register 410 contents will be copied to the R register 420.

3) If key_ctr is zero then in a first clock cycle 710, contents of W register 410 will be copied to the R register 420 with the help of multiplexers M7 to M14. Otherwise, R_reg(7) will be input to multiplexer M1 and intermediate key results out0 to out7 will be selected by multiplexers M7 to M14, respectively. Temp_e will be input for multiplexer M3. In any case, Multiplexer M15 will select R_reg(0) to R_reg(3) and output 128 bits of a 256-bit round key.

4) In a second clock cycle 720, multiplexer M15 will select R_reg(4) to R_reg(7) and output the other 128 bits of the 256-bit round key and no round key will be generated.

5) Steps 3 and 4 will be repeated until all the round keys are generated (e.g., round keys 160-0 through 160-Nr of FIG. 1 are generated).

6) For new "plain text" encryption steps 2, 3, 4 and 5 will be repeated. For new cipher key encryption, steps 1, 2, 3, 4 and 5 will be repeated.

For 256-bit decryption, the key expansion block 400 performs the following exemplary steps (refer to both FIG. 4 and FIG. 7B, which is an exemplary timing diagram illustrating timing for certain signals for 256-bit cipher key decryption using the circuit of FIG. 4):

1) Steps 1, 2, 3, 4, and 5 of "256 bit encryption" above for key expansion block 400 will be repeated.

2) The W register 410 will be rewritten with a 256-bit round key from the R register 420.

3) In a second clock cycle 725, multiplexer M15 will select only the registers R_reg(0) to R_reg(3) and output 128 bits of a first 256-bit round key. 128 bits of a 256-bit round key are generated.

4) In a third clock cycle 730, Dout7 will be input to multiplexer M1. Temp_d and Temp_e will be input for multiplexers M3 and M16. Multiplexers M7 to M13 will select the out0, Dout1 to Dout7, respectively, and write these into the R_reg(0) to R_reg(7), respectively. Multiplexer M15 will select R_reg(4) to R_reg(7) and output 128 bits of the first 256-bit round key. 256 bits are generated, of which 128 bits are consumed in cycle 730.

5) In a fourth clock cycle 740, multiplexer M15 will select R_reg(0) to R_reg(3) and output 128 bits of a second 256-bit round key. No portion of a round key is generated.

6) Steps 4 and 5 will be repeated until first round key (e.g., round key 260-0 of FIG. 2) is generated.

7) Steps 3, 4, and 5 will be repeated for next cipher text and the W register 410 will be copied to the R register 420.

8) Steps 1 to 5 will be repeated if the cipher key changes.

Using key expansion block 400, there are no extra wait states when operated in the decryption mode, as the last round key (which is the starting point for decryption) is computed and stored in the W register 410. The architecture of FIG. 4 can also be extended to provide 32-, 64-, or 96-bit round keys by modifying the configuration of the counters and the multiplexer M15, as would be apparent to those skilled in the art.

Although round keys have been described herein, embodiments of the present invention are useful any time keys are being generated using other keys. Additionally, the exemplary embodiments in FIGS. 3 and 4 produce 128 bits of round keys per cycle, but the embodiments can be modified to produce other numbers of bits, such as outputting entire 128-, 192-, or 256-bit round keys each cycle. Furthermore, although typically at least a portion of a round key would be output in the same cycle the round key (or a portion thereof) is generated, the portion of the round key could be delayed by one or more cycles before being output. Illustratively, the architecture of FIGS. 3 and 4 can be modified for other round key sizes, as described above.

It is to be understood that the embodiments and variations shown and described herein are merely illustrative of the principles of this invention and that various modifications may be implemented by those skilled in the art without departing from the scope and spirit of the invention.

APPENDIX

Algorithm parameters, symbols, and functions are defined as follows:

| Parameters | Definition |
| --- | --- |
| K | Cipher Key. |
| Nb | Number of columns (32-bit words) comprising the state. For this standard, Nb = 4. |
| Nk | Number of 32-bit words comprising the cipher key. For this standard, Nk = 4, 6, or 8 depending on the key size used. |
| Nr | Number of rounds, which is a function of Nk and Nb (which is fixed). For this standard, Nr = 10, 12, or 14. |
| Rcon | The round constant word array. |
| RotWord | Function used in the key expansion routine that takes a four-byte word and performs a cyclic permutation. |
| SubWord | Function used in the key expansion routine that takes a four-byte input word and applies an S-box to each of the four bytes to produce an output word |
| S-box | Non-linear substitution table used in several byte substitution transformations and in the Key Expansion routine to perform a one-for-one substitution of a byte value. |

Key-Block-Round Combinations:

For the AES algorithm, the length (e.g., the key size) of the cipher key, K, is 128, 192, or 256 bits. The key length is represented by Nk=4, 6, or 8, which reflects the number of 32-bit words (e.g., number of columns) in the cipher key.

For the AES algorithm, the number of rounds to be performed during the execution of the algorithm is dependent on the key size. The number of rounds is represented by Nr, where Nr=10 when Nk=4, Nr=12 when Nk=6, and Nr=14 when Nk=8.

|  | KEY LENGTH (Nk words) | BLOCK SIZE (Nb words) | No. of Rounds (Nr) |
| --- | --- | --- | --- |
| AES-128 | 4 | 4 | 10 |
| AES-192 | 6 | 4 | 12 |
| AES-256 | 8 | 4 | 14 |

We claim:

1. An apparatus for generation of keys having one of a plurality of key sizes, the apparatus comprising:

a memory element comprising a plurality of memory sections, each memory section adapted to store a portion of a key, the memory element having a size at least as large as a largest key size of the plurality of key sizes, the key having a size of one of the plurality of key sizes;

key generation logic coupled to the memory element, the key generation logic adapted to generate a plurality of intermediate key results for the key by operating on values from a plurality of memory sections and from a plurality of intermediate key results;

key selection logic coupled to the memory element, to the intermediate key results, and to control logic, the key selection logic adapted to feedback, under control of the control logic, selected intermediate key results to selected ones of the memory sections for utilization by said key generation logic; and the control logic coupled to the key selection logic, the control logic adapted, based at least partially on the size of the key, to select the selected intermediate key results and the selected ones of the memory sections, wherein the selected intermediate key results comprise some or all of the key.

2. The apparatus of claim 1, wherein the control logic is further adapted to determine the size of the key.

3. The apparatus of claim 1, wherein the key is a current round key determined when the key generate logic operates on values, stored in the memory element, of a cipher key or a previously generated round key.

4. The apparatus of claim 1, wherein the selected intermediate key results are portions of round keys defined by the "Specification for the Advanced Encryption Standard (AES)," Federal Information Processing Standard (FIPS) Publication 197.

5. The apparatus of claim 1, wherein:
the apparatus further comprises output logic coupled to the control logic and to the memory element, the output logic adapted to route, under control of the control logic, a number of memory sections to an output; and wherein the control logic is adapted to choose which of the memory sections to output and to cause the output logic to route the number of chosen memory sections to the output.

6. The apparatus of claim 5, wherein the control logic is further adapted to determine whether encryption or decryption is being performed and, based at least partially on whether encryption or decryption is being performed and the size of the key, to choose which of the memory sections to output.

7. The apparatus of claim 5, wherein the output memory sections comprise all of the key.

8. The apparatus of claim 5, wherein the output memory sections comprise some of the key.

9. The apparatus of claim 1, wherein the control logic is further adapted to determine whether encryption or decryption is being performed and, based at least partially on whether encryption or decryption is being performed and the size of the key, to select the selected intermediate key results and the selected ones of the memory sections.

10. The apparatus of claim 9, wherein the control logic is further adapted:
to cause the key generation logic to generate a number of keys during encryption or decryption;
to cause the key selection logic to feedback the keys to the memory element;
to determine values for a key counter, the key counter indicating how many keys have been generated; and
to use the key counter to determine when encryption or decryption is to be stopped.

11. The apparatus of claim 1, wherein:
the memory element is an output memory element;
the apparatus further comprises an input memory element coupled to the output memory element through the key selection logic, the input memory element comprising a size equivalent to the size of the output memory element, the input memory element having a plurality of memory sections adapted to store a plurality of portions of a reference key; and
wherein the control logic is further adapted to copy the reference key in the input memory element to the output memory element.

12. The apparatus of claim 11, wherein the control logic is further adapted:
to determine that decryption is to be performed;
to cause the key generation logic to operate for a number of encryption operations, the number of encryption operations based on at least the size of the key, thereby generating a plurality of encryption keys;
to copy a final encryption key, generated after the predetermined number of key generation logic operations, to the input memory element from the output memory element; and
to cause the key generation logic to operate for a predetermined number of decryption operations, the number of decryption operations based on at least the size of the key, thereby generating a plurality of decryption keys.

13. The apparatus of claim 1, wherein the control logic is further adapted:
to determine that encryption is to be performed; and
to cause the key generation logic to operate for a number of encryption operations, the number of encryption operations based on at least the size of the key, thereby generating a plurality of encryption keys.

14. The apparatus of claim 1, wherein the key generation logic comprises:
a plurality of exclusive-or (XOR) devices, each XOR device coupled to two XOR inputs and producing one of the plurality of intermediate key results, each XOR input coupled to an intermediate key result or to one of the memory sections.

15. The apparatus of claim 14, wherein:
the key generation logic further comprises a plurality of multiplexers;
a majority of the multiplexers are coupled to inputs of the XOR devices, each of the majority of multiplexers having a plurality of inputs, each input comprising either a memory section or an intermediate key result, each of the majority of multiplexers adapted to route one of the inputs to an input of a corresponding XOR device;
the control logic is coupled to and controls the plurality of multiplexers.

16. The apparatus of claim 14, wherein the key generation logic further comprises one or more key generation function modules producing one or more module outputs coupled to one or more XOR inputs of the plurality of XOR devices, each of the one or more key generation function modules having inputs of and operating on either a memory section or intermediate key result.

17. The apparatus of claim 1, wherein the key selection logic comprises a plurality of multiplexers.

18. The apparatus of claim 1, wherein the apparatus is formed as part of an integrated circuit.

19. An integrated circuit comprising one or more apparatus for generation of keys having one of a plurality of key sizes, each of the one or more apparatus comprising:

a memory element comprising a plurality of memory sections, each memory section adapted to store a portion of a key, the memory element having a size at least as large as a largest key size of the plurality of key sizes, the key having a size of one of the plurality of key sizes;

key generation logic coupled to the memory element, the key generation logic adapted to generate a plurality of intermediate key results for the key by operating on values from a plurality of memory sections and from a plurality of intermediate key results;

key selection logic coupled to the memory element, to the intermediate key results, and to control logic, the key selection logic adapted to feedback, under control of the control logic, selected intermediate key results to selected ones of the memory sections for utilization by said key generation logic; and the control logic coupled to the key selection logic, the control logic adapted, based at least partially on the size of the key, to select the selected intermediate key results and the selected ones of the memory sections, wherein the selected intermediate key results comprise some or all of the key.

20. An apparatus for operating on input text, comprising:

a key expansion module for generation of keys having one of a plurality of key sizes, the key expansion module comprising:

a memory element comprising a plurality of memory sections, each memory section adapted to store a portion of a key, the memory element having a size at least as large as a largest key size of the plurality of key sizes, the key having a size of one of the plurality of key sizes;

key generation logic coupled to the memory element, the key generation logic adapted to generate a plurality of intermediate key results for the key by operating on values from a plurality of memory sections and from a plurality of intermediate key results;

key selection logic coupled to the memory element, to the intermediate key results, and to control logic, the key selection logic adapted to feedback, under control of the control logic, selected intermediate key results to selected ones of the memory sections for utilization by said key generation logic;

the control logic coupled to the key selection logic, the control logic adapted, based at least partially on the size of the key, to select the selected intermediate key results and the selected ones of the memory sections, wherein the selected intermediate key results comprise some or all of the key; and output logic coupled to the control logic and to the memory element, the output logic adapted to route, under control of the control logic, a number of memory sections to an output; and an algorithm block coupled to the output of the key expansion block, the algorithm block operating on the input text using keys from the key expansion block to produce output text.

* * * * *